(12) United States Patent
Yurzola et al.

(10) Patent No.: US 9,134,918 B2
(45) Date of Patent: Sep. 15, 2015

(54) PHYSICAL COMPRESSION OF DATA WITH FLAT OR SYSTEMATIC PATTERN

(75) Inventors: Damian P. Yurzola, Santa Clara, CA (US); Sergey A. Gorobets, Edinburgh (GB); Neil D. Hutchison, Larbert (GB); Eran Erez, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 744 days.

(21) Appl. No.: 12/651,133

(22) Filed: Dec. 31, 2009

(65) Prior Publication Data
US 2011/0161559 A1 Jun. 30, 2011

(51) Int. Cl.
*G06F 3/06* (2006.01)
*G06F 12/02* (2006.01)

(52) U.S. Cl.
CPC ............ *G06F 3/0652* (2013.01); *G06F 3/0608* (2013.01); *G06F 3/0616* (2013.01); *G06F 3/0641* (2013.01); *G06F 3/0679* (2013.01); *G06F 12/0246* (2013.01); *G06F 2212/401* (2013.01); *G06F 2212/7205* (2013.01); *G06F 2212/7209* (2013.01)

(58) Field of Classification Search
CPC . G06F 3/0652; G06F 12/0246; G06F 3/0641; G06F 3/0679; G06F 3/0616; G06F 3/0608; G06F 2212/7209; G06F 2212/401; G06F 2212/7205
See application file for complete search history.

(56) References Cited

U.S. PATENT DOCUMENTS

| | | | |
|---|---|---|---|
| 7,624,239 B2 | 11/2009 | Bennett et al. | |
| 2001/0008564 A1 | 7/2001 | Hirao et al. | |
| 2003/0070036 A1 | 4/2003 | Gorobets | |
| 2004/0143710 A1 | 7/2004 | Walmsley | |
| 2004/0221125 A1 | 11/2004 | Ananthanarayanan et al. | |
| 2005/0251617 A1 | 11/2005 | Sinclair et al. | |
| 2006/0010151 A1 | 1/2006 | Star Sung | |
| 2006/0184719 A1 | 8/2006 | Sinclair | |
| 2007/0043900 A1 | 2/2007 | Yun | |

(Continued)

FOREIGN PATENT DOCUMENTS

| | | |
|---|---|---|
| EP | 2 042 995 A1 | 4/2009 |
| WO | 2007/047062 A2 | 4/2007 |

(Continued)

OTHER PUBLICATIONS

"Data Compression Algorithms", by: Jeffrey N. Ladino, 1996, http://www.ccs.neu.edu/home/jnl22/oldsite/cshonor/jeff.html.*
Schneier, Bruce, "Applied Cryptography", John Wiley & Sons, Inc. (ISBN 0471128457), Reprinted: 2007 (764 pages).
U.S. Appl. No. 12/651,176, filed Dec. 31, 2009, entitled "Erase Command Caching to Improve Erase Performance on Flash Memory" (40 pages).

(Continued)

*Primary Examiner* — Michael Alsip
(74) *Attorney, Agent, or Firm* — Brinks Gilson & Lione

(57) ABSTRACT

Systems and methods are disclosed to improve the performance of a memory system by freeing up physical memory areas that correspond to logical block address ranges that have repeated data patterns. A controller detects data patterns in incoming data. When a data pattern is detected, the data is not written to non-volatile storage area. Rather, the logical block address range of the data is marked in a data structure as having pattern data. The pattern may also be recorded in the data structure as a pattern descriptor. Because the data having the data pattern is not written to the non-volatile storage area, the freed up corresponding physical memory area may be utilized by the memory system for other purposes, thereby improving the overall performance and endurance of the memory system.

19 Claims, 9 Drawing Sheets

(56) References Cited

U.S. PATENT DOCUMENTS

| | | | |
|---|---|---|---|
| 2007/0094178 A1 | 4/2007 | Shin et al. | |
| 2007/0113029 A1 | 5/2007 | Bennett et al. | |
| 2007/0143570 A1 | 6/2007 | Gorobets et al. | |
| 2007/0143571 A1 | 6/2007 | Sinclair et al. | |
| 2008/0040580 A1 | 2/2008 | Cohen et al. | |
| 2008/0049259 A1 | 2/2008 | Asano | |
| 2008/0082775 A1 | 4/2008 | Gorobets | |
| 2008/0155180 A1 | 6/2008 | Shibata et al. | |
| 2008/0155301 A1 | 6/2008 | Ahvenainen et al. | |
| 2008/0243954 A1 | 10/2008 | Augenstein et al. | |
| 2008/0288436 A1 | 11/2008 | Priya N V | |
| 2008/0307164 A1 | 12/2008 | Sinclair | |
| 2008/0307192 A1 | 12/2008 | Sinclair et al. | |
| 2009/0089482 A1 | 4/2009 | Traister | |
| 2009/0089483 A1* | 4/2009 | Tanaka et al. | 711/103 |
| 2009/0150596 A1 | 6/2009 | Cheng | |
| 2011/0202709 A1* | 8/2011 | Rychlik | 711/103 |

FOREIGN PATENT DOCUMENTS

| | | |
|---|---|---|
| WO | 2008/078314 A1 | 7/2008 |
| WO | 2009/117251 A1 | 9/2009 |

OTHER PUBLICATIONS

U.S. Appl. No. 12/828,029, filed Jun. 30, 2010, entitled "Virtual Copy and Virtual Write of Data in a Storage Device" (35 pages).

International Search Report issued in international application number PCT/US2010/061087, mailed Mar. 21, 2011 (5 pages).

Written Opinion issued in international application number PCT/US2010/061087, mailed Mar. 21, 2011 (5 pages).

International Preliminary Report on Patentability issued in international application number PCT/US2010/061087, dated Jul. 4, 2012 (6 pages).

Office Action issued in U.S. Appl. No. 12/651,176, dated Nov. 21, 2012 (8 pages).

International Search Report for PCT/US2010/061092, mailed Apr. 19, 2011, 7 pages.

International Written Opinion for PCT/US2010/061092, mailed Apr. 19, 2011, 12 pages.

International Preliminary Report on Patentability for PCT/US2010/061092, dated Jul. 4, 2012, 13 pages.

* cited by examiner

PHYSICAL COMPRESSION OF DATA WITH FLAT OR SYSTEMATIC PATTERN

TECHNICAL FIELD

The present disclosure relates generally to non-volatile memory systems for data storage and retrieval having a memory controller for compressing data. Particularly, a technique is disclosed for improving the performance of a memory system by identifying repeated data patterns in data received from a host, compressing the data, and freeing up the corresponding physical memory area.

BACKGROUND

Non-volatile memory systems typically manage memory by logically organizing the basic unit of physical erase (erase block) into composite logical groupings (metablocks or logical groups), where an erase block generally consists of a number of sectors. When an erase command is received, the specified sectors are checked against the memory system's control data. If the specified sectors span one or more full logical groups, the full logical group(s) can each be treated as a whole and erased according to one process (such as performing a true, physical erase), while other specified sectors that do not span a full logical group, are "logically" erased at the sector level by standard techniques. For flash EEPROM, the memory is electrically erasable either all at once or by one or more minimum erasable blocks at a time, where a minimum erasable block may consist of one or more sectors and each sector may store 512 bytes or more of data. An erase operation may take as much as an order of magnitude longer than read and program operations. Thus, it is desirable to have the erase block of substantial size. In this way, the erase time is amortized over a large aggregate of memory cells.

The nature of flash memory predicates that data can be written only to memory locations that have been erased. If data of a certain logical address from a host is to be updated, one way is to rewrite the update data in the same physical memory location. That is, the logical to physical address mapping is unchanged. However, this will mean the entire erase block that contains that physical memory location will have to be first erased and then rewritten with the updated data. This method of update is inefficient, as it requires an entire erase block to be erased and rewritten, especially if the data to be updated only occupies a small portion of the erase block. It will also result in a higher frequency of erase recycling of the memory block, which is undesirable in view of the limited endurance of this type of memory device.

In EEPROM memory, as well as in other forms of non-volatile memory, the memory cells need to be erased before they can be rewritten to with new data content. When the data in a portion of the memory becomes obsolete, or the memory device receives a command to erase a particular portion, in more advanced memory systems it is common for the designated portions not to be erased immediately at that time, but to be "logically erased" by being marked for erase, with the actual, physical erase taking place at a later time. This may be done for a number of reasons. As noted above, an erase process typically takes quite a bit longer than a simple write. The write is also often simpler to execute. Thus, when a data portion becomes obsolete or is chosen for erase, the memory system will instead write a data pattern to the memory portion, set a flag, or otherwise designate it as erased. Once the memory system has time, or is in need of additional erased sectors, the "logically erased" portion can then be physically erased when convenient, for example in a background process. It may also be the case that the portion of the memory to be erased is less than the minimum unit of erase for the memory. For example, a flash memory could receive a command to erase a sector of data. However, flash memories are commonly formed such that the basic physical unit of erase is a block, typically composed of multiple sectors. These erase blocks are then usually combined into composite logical structures, such as metablocks or other logical groups, which the controller then treats as a basic unit for memory management. As multiple sectors are grouped together in erase blocks, metablocks and/or other logical groupings, erasing a single sector by itself is not usually possible, as this would also erase the rest of the corresponding meta-block or larger logical structure.

SUMMARY

Systems and methods are disclosed to improve the performance of a memory system by freeing up physical memory areas that correspond to logical block address ranges that have data patterns. A controller detects data patterns in data received from a host. When a data pattern is detected, the data is not written to the non-volatile storage area. Rather, the logical block address range of the data is marked in a data structure as having pattern data. The data structure stores information about data that spans more than a single logical sector. Additional logical block address ranges are added to the data structure as patterned data is received from the host. The freed up physical memory space may be utilized by the memory system for other purposes, thereby improving the performance and endurance of the memory system. When cumulative logical block address ranges span an entire logical group, a physical erase command may be issued to erase the logical group.

A method is disclosed for compressing data written to a non-volatile memory system by receiving the data from a host, detecting a pattern in the data, recording in a data structure a logical block address range of the data without writing the data to non-volatile memory, and marking the logical block address range in the data structure as having pattern data. The data structure may be one of: an erased fragment descriptor, an erased command log, a binary cache, a group address table, or other data structure.

The disclosed method may include one or more of the following acts: detecting the pattern in the data by comparing data portions in the data with one another; the data portions may be compared by an XOR operation between successive data portions; recording in the data structure a plurality of logical block address ranges of data received from the host; marking the plurality of logical block address ranges in the data structure as having pattern data; issuing a physical erase of the plurality of logical block address ranges if it is determined that the plurality of logical block address ranges span an entire logical group, such as a metablock; utilizing an area of physical memory corresponding to the logical block address range as at least one of a binary cache, an update block, a spare block in a block pool, an index table, or other memory management structure; and detecting a pattern in the data by monitoring the data as the data is received from the host.

A non-volatile memory system is also disclosed that executes at least one or more of the method steps.

Other features and advantages will become apparent upon review of the following drawings, detailed description and claims. Additionally, other embodiments are disclosed, and each of the embodiments can be used alone or together in

DETAILED DESCRIPTION

Figure 1:
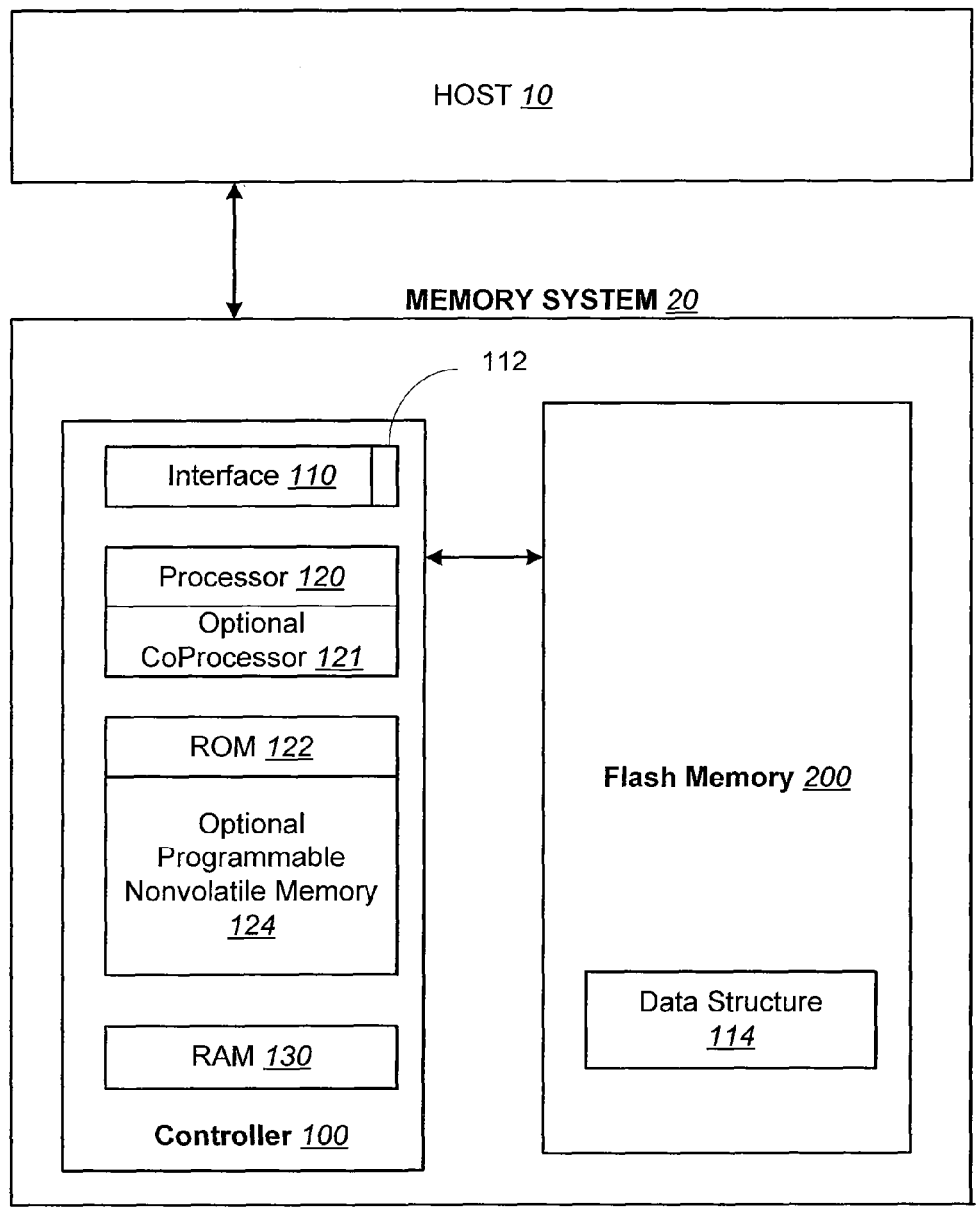
FIG. 1 illustrates schematically the main hardware components of a memory system suitable for implementing the present invention.

FIG. 1 illustrates schematically the main hardware components of a memory system 20 suitable for implementing the present invention. The memory system 20 typically operates with a host 10 through a host interface. The memory system 20 is typically in the form of a memory card or an embedded memory system. The memory system 20 includes a memory 200 whose operations are controlled by a controller 100. The memory 200 comprises one or more array(s) of non-volatile memory cells distributed over one or more integrated circuit chips. The controller 100 includes an interface 110, a processor 120, an optional co-processor 121, ROM 122 (read only memory), RAM 130 (random access memory) and optionally programmable non-volatile memory 124. RAM 130 may include static and/or dynamic RAM (SRAM and/or DRAM) and/or other type of RAM. The interface 110 has one component interfacing the controller to the host 10 and another component interfacing to the memory 200. Firmware stored in nonvolatile ROM 122 and/or the optional non-volatile memory 124 provides codes for the processor 120 to implement the functions of the controller 100. Error correction codes may be processed by the processor 120 or the optional co-processor 121. In an alternative embodiment, the controller 100 is implemented by a state machine (not shown). In yet another embodiment, the controller 100 is implemented within the host 10.

Figure 2:
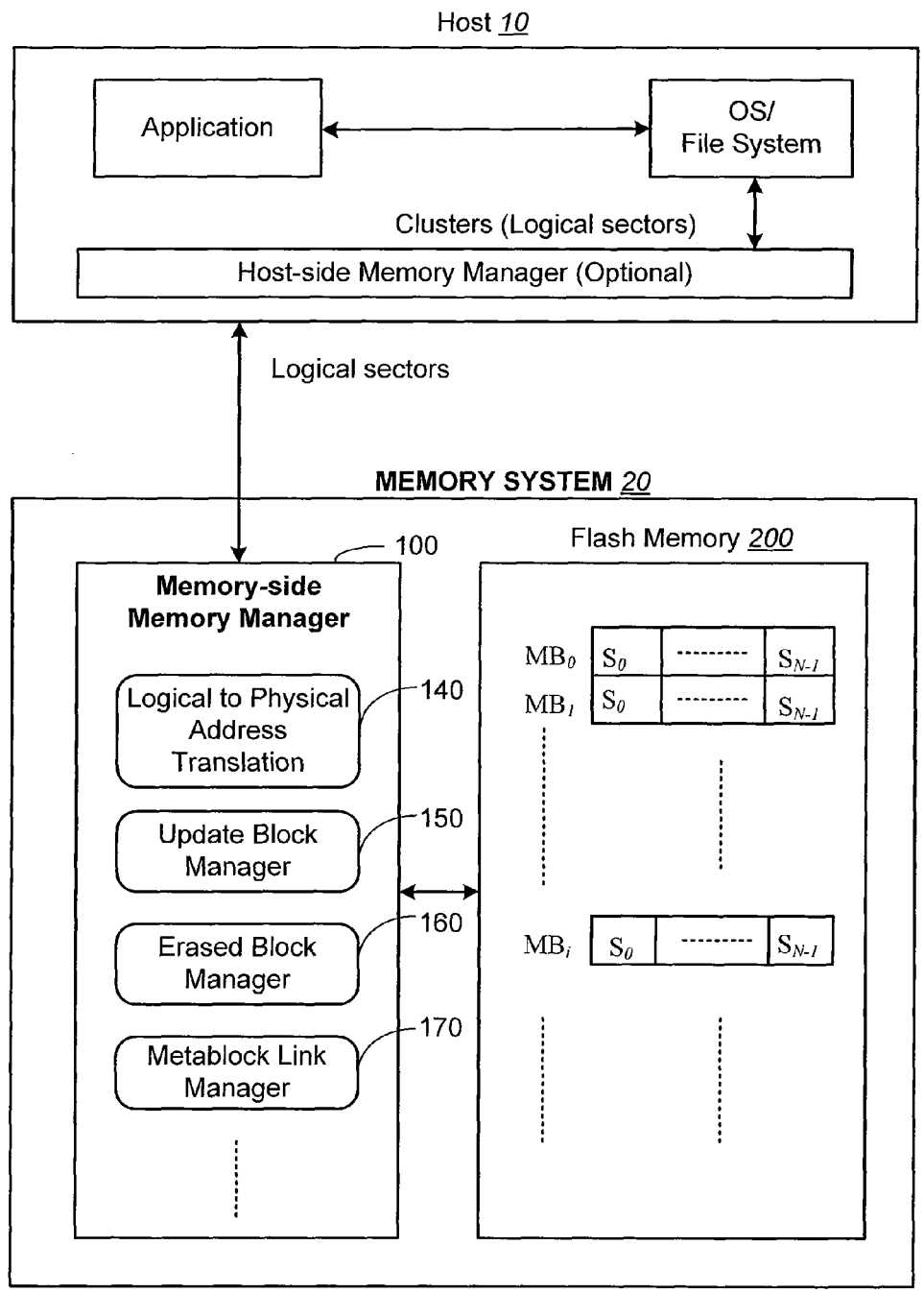
FIG. 2 illustrates the memory organized into physical groups of sectors (or metablocks) and managed by a memory manager of the controller, according to one preferred embodiment of the disclosure.

FIG. 2 illustrates the memory 200 organized into physical groups of sectors (or metablocks) and managed by a memory manager of the controller 100. The memory 200 is organized into metablocks, where each metablock $MB_0$, $MB_1$, ... $MB_j$, is a group of physical sectors $S_0$, ..., $S_{N-1}$ that are erasable together.

The host 10 accesses the memory 200 when running an application under a file system or operating system. Typically, the host system addresses data in units of logical sectors where, for example, each sector may contain 512 bytes of data. Also, it is usual for the host 10 to read or write to the memory system 20 in units of logical clusters, each consisting of one or more logical sectors. In some host systems, an optional host-side memory manager may exist to perform lower level memory management at the host. In most cases during read or write operations, the host 10 essentially issues a command to the memory system 20 to read or write a segment containing a string of logical sectors of data with contiguous addresses.

A memory-side memory manager is implemented in the controller 100 of the memory system 20 to manage the storage and retrieval of the data of host logical sectors among metablocks of the flash memory 200. In the preferred embodiment, the memory manager contains a number of software modules for managing erase, read and write operations of the metablocks. The memory manager also maintains system control and directory data associated with its operations among the flash memory 200 and the controller RAM 130.

Figure 3A:
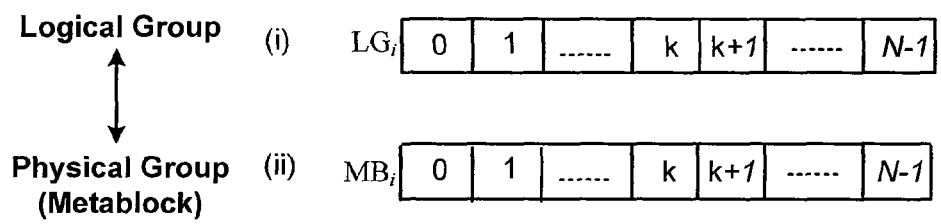
FIG. 3A illustrates schematically the mapping between a logical group and a metablock, according to a preferred embodiment of the disclosure.

FIG. 3A illustrates schematically an example of mappings between a logical group and a metablock. The metablock of the physical memory has N physical sectors for storing N logical sectors of data of a logical group. FIG. 3A, at (i) shows the data from a logical group $LG_i$, where the logical sectors are in contiguous logical order 0, 1, ..., N-1 and, at (ii), the same data being stored in the metablock in the same logical order. The metablock when stored in this manner is said to be "sequential." In general, the metablock may have data stored in a different order, in which case the metablock is said to be "non-sequential."

Figure 3B:
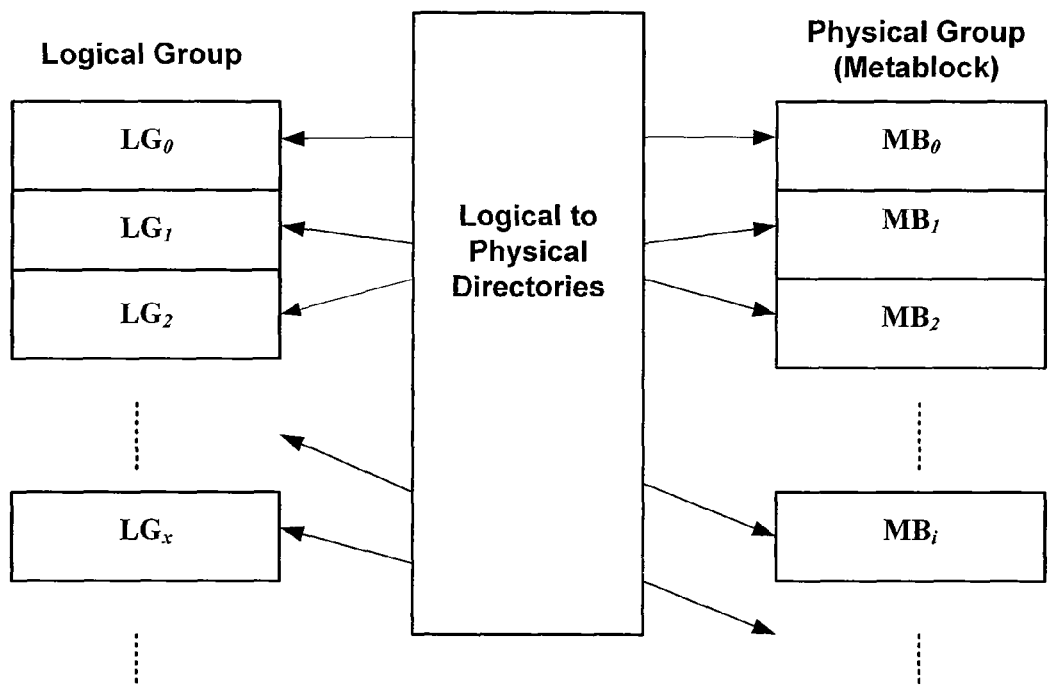
FIG. 3B illustrates schematically an example of mapping between logical groups and metablocks.

FIG. 3B illustrates schematically an example of a mapping between logical groups and metablocks. Each logical group is mapped to a unique physical metablock, except for a small number of logical groups in which data is currently being updated. After a logical group has been updated, it may be mapped to a different metablock. The mapping information is maintained in a set of logical to physical directories, which may be tables stored in non-volatile and/or other memory within the memory system 20.

Referring back to FIG. 2, the host 10 may issue an erase command, such as an Erase Sectors command, that identifies a range of addresses covering one or more logical sectors, or one or more logical groups (i.e., erase blocks). In some applications, the host 10 may issue erase commands for consecutive or non-consecutive logical groups that, collectively, span one or more full and/or partial metablock(s) of physical memory. An erase command that spans logical addresses for a partial metablock is said to be non-aligned. In other words, the erase command, or at least a part of the erase command, is for erasing a partial metablock, i.e., not the entire metablock. Typically, when the controller 100 erases logical blocks that are not metablock aligned, longer erase times result because more operations are required to either store in memory or separately erase multiple regions of the metablock (to eventually erase the entire metablock), compared to the more efficient operation of erasing the entire metablock at once. Depending on the standard used for the particular memory (e.g., Compact Flash (CF) cards, SD cards, and etc.), the erase command indicates that the controller is to convert data associated with the logical range to an erase pattern, such as a pattern of 0's, 1's, F's or other pattern used by the applicable standard.

When the controller 100 receives a non-aligned erase command, the erase command may be split into parts based on the respective metablocks encompassed by the erase command. For example, one part of an erase command may span an entire metablock, while other parts of the erase command may span partial metablocks. In some applications of non-volatile memory systems, a first part is all sectors at the start of the command which start partway through a metablock and span to the end of that metablock, a second part of the command includes complete metablocks to be erased, and a third part of the command starts at the beginning of a metablock and finishes partway through that metablock.

Figure 4:
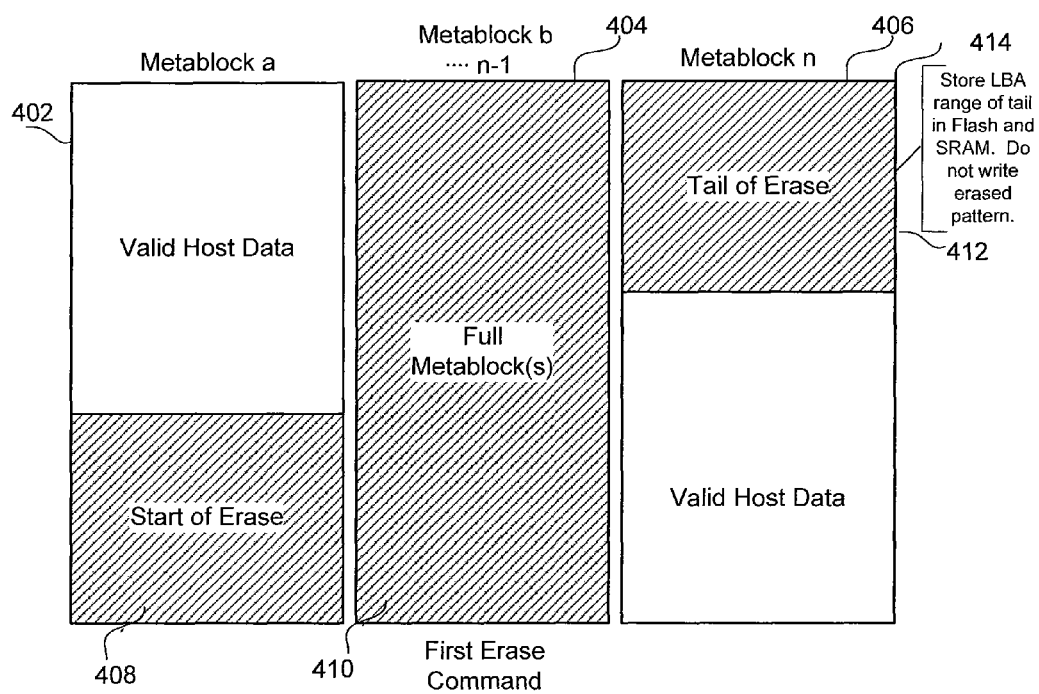
FIG. 4 shows a graphical representation of a plurality of metablocks having areas marked for erasure by shading.

FIG. 4 shows three metablocks 402, 404, and 406 having shaded areas that represent logical group areas that are the target of an erase command. Metablock "a" 402 has a shaded area 408 that is the first part of the erase command. Metablock "b" 404 has a shaded area 410 (the entire metablock) that is the second part of the erase command. Additional metablocks from "b" to "n−1" may be included in the second part of the erase command. Metablock "n" 406 has a shaded area 412 that is the third part of the erase command. The second part is a true erase of the entire metablock and a physical erase command may be issued for the complete metablock(s) "b" to "n−1" at a time determined by the controller. The first and third parts may be treated as no data write commands of an erase pattern to the logical blocks. However, no data write commands of erase patterns (that is, writing the erase patterns to memory) consume a substantial amount of time and may interfere with (e.g., slow down) the program and/or host and memory activity. As described below, the first and third parts may instead be handled by the controller storing their respective address ranges without writing an erase pattern to memory, thereby reducing the number of partial metablocks that are erased by writing erase patterns to memory. As subsequent erase commands are received, the address ranges of the first and third parts are extended through metablocks "a" 402 and "n" 406. Once the address range extends through the entire metablock "n" 406, for example, a physical erase command may be issued for the metablock. Concatenating erase commands and erasing an entire metablock, rather than writing erase patterns to memory, reduces erasure time and improves the performance of the memory system 20. Erase commands may be concatenated on any type of non-volatile memory, including D1, D2, and D3 memories, where D1 memory is single level cell (SLC), or binary, memory capable of storing one bit per memory cell and D2 and D3 represents multi-level cell (MLC) memory capable of storing two or three bits per memory cell, respectively. In a version, the memory system 20 is a D3 flash memory where the metablock size is not a power of two.

When the memory system 20 receives an erase command from the host 10, the length of the erase command is known. If there has been no previous erase command the controller 100 will record the logical block address (LBA) of the beginning of the erased section 408 and the length of the erased section.

The controller 100 then issues a physical erase command to erase the full metablocks
("b" to "n−1") contained in the command. At the end of this phase of the command, the controller 100 records the completion of this phase in flash memory 200. During this write, the controller 100 also writes information for the "head" 408 and "tail" 412 (i.e., the beginning of the erase block and the end of the erase block) of the command. The head and tail information includes the logical block address ranges of the head 408 and tail 412. The controller 100 does not erase the head and tail sectors in flash memory 200 by writing the erased pattern to memory. The controller 100 stores in memory 200 and/or RAM 130 the range of LBA's that encompass the head 408 and tail 412.

The technique for improving erase performance will continue to be described below with reference to the tail 412. However, it is to be understood that the technique is equally applicable to the head 408. It will also be understood that the first and third parts of the erase command may span any logical block address range within their respective metablocks. In other words, the shaded areas 408 and/or 412 may span any area within their respective metablocks "a" and "n". Shaded area 408 need not span to the end of metablock "a" 402. Likewise, shaded area 412 need not begin at the start of metablock "n" 406.

Referring now to metablock "n" 406, there are a number of possible ways to store information that identifies the logical group marked for erasure (i.e., the tail in the example of FIG. 4). The controller 100 may update the erase block management (EBM) 160 control sector at the end of the true erase. This update may include storing information about the tail in the EBM 160 control sector. The tail information may take any form that identifies the tail, preferably without writing an erase pattern to memory. For example, the information stored may be the start LBA 414 and the length of the tail. The information may also or alternatively be stored in a scratchpad memory as a flag. The information may also or alternatively be stored as an update to a binary cache as a fragment (i.e., an otherwise unused free storage area). The information may be an identification of the first logical group in the metablock, an offset if applicable, and the tail length. If stored as a fragment, the erase pattern may also be stored.

In yet another approach, the information about the erase tail is stored as a special fragment (i.e., data entry) in the binary cache. The entire tail may be covered by one fragment. Address translation may be used to return data about the erased tail. The data may be written to the memory block during garbage collection (GC) at a non-critical time. GC operations are periodically performed on blocks in flash memory in order to recover obsolete space in the blocks as files are deleted or updated. GC may consist of copying remaining valid data from a previously written-to block to a new block so that the previously written-to block may be recycled for later use. For further information on garbage collection please refer to U.S. patent application Ser. No. 11/541,371 entitled "Phased Garbage Collection" and filed on Sep. 29, 2006, which is hereby incorporated by reference in its entirety.

The header of an erase command may also be stored, which reduces the overhead for the header of commands. By writing the erased data to the binary cache as a fragment, normal binary cache rules may be used to increase the fragment, and more than one erase fragment may be stored. Overlapping erase commands may also be handled this way because the data is not a special entry in a data structure, but is a fragment in the binary cache which the controller 200 may handle as it would any other fragment. Although a typical use case of a head and a tail is described herein, where erase commands are received in sequential order, erase commands received in any order can be concatenated and managed using the same techniques described herein. Thus, erase fragment descriptors can be merged and concatenated for random erase sequences or sequential erase sequences.

Figure 5:
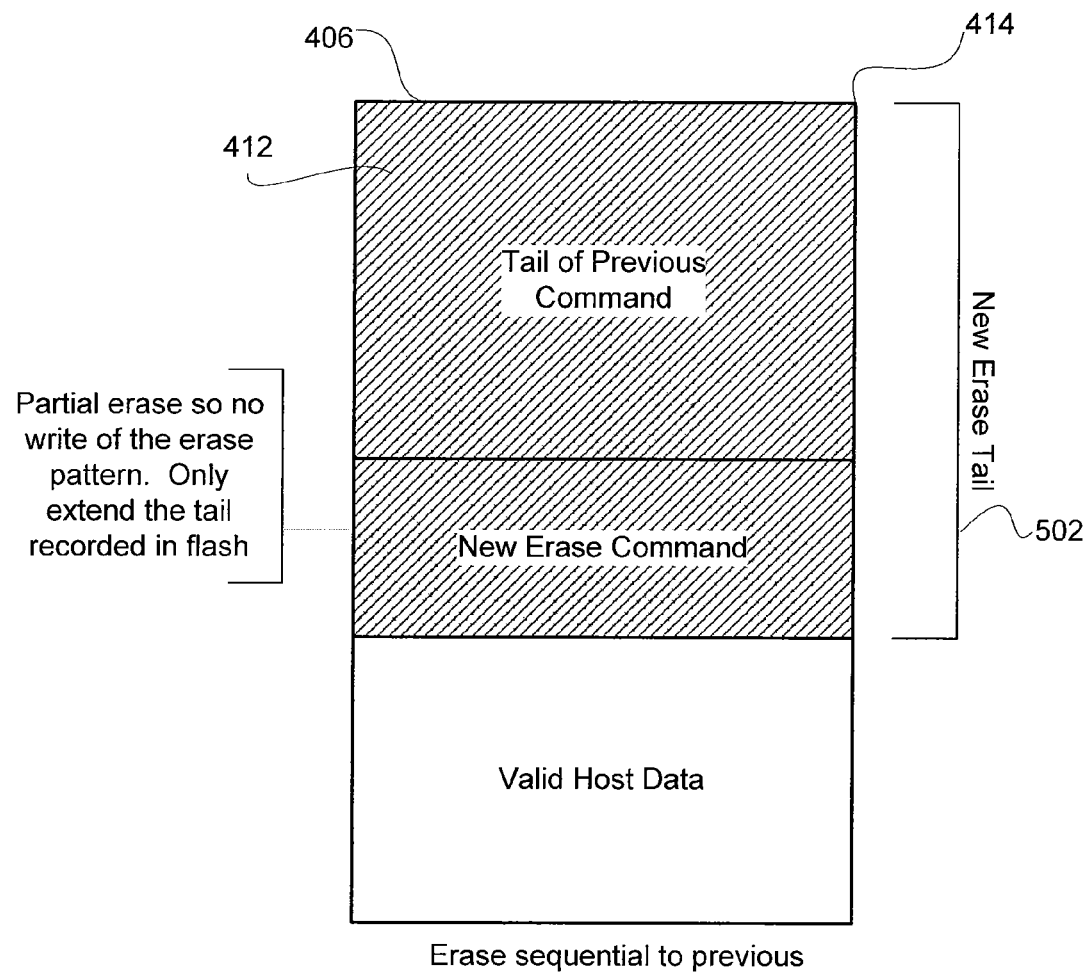
FIG. 5 shows a graphical representation of the erase tail illustrated in FIG. 4 extended following a successive erase command from a host.

When the host 10 sends a new erase command to the memory system 20, the controller 100 checks the previously stored tail information. If the address range of the new command is within metablock "n" 406 the controller 100 stores address information about the new erase command with the address information about the tail of the previous command. FIG. 5 shows a graphical representation of the erase tail illustrated in FIG. 4 extended (via concatenation) following a subsequent, new erase command from the host 10. If the command does not extend the tail 412 through the entire metablock 406 (as is illustrated in FIG. 5), the address range is added to the address range of the tail information in RAM 130 and updated in the flash memory 200. However, as with the previous erase tail, the erase pattern is not written to the flash memory 200 for the updated LBA range 502. For each new erase command, the controller 100 determines whether an address range of the erase command is within metablock "n" 406. When one or more new erase commands plus the tail spans an entire metablock, the metablock is marked for physical erasure, and the address range of the new tail, if any (extending into the next metablock, not shown), may be recorded in flash memory 200 and/or RAM 130 as previously described. Using this technique, the number of partial metablock erases may be decreased, which will improve the performance of the memory system 20.

The logical block address ranges of the erase commands received from the host may span contiguous or non-contiguous areas of the metablock. The logical block address ranges may be received as sections present anywhere within the metablock, and in any order. The contiguous or non-contiguous sections are stored. The controller determines when the concatenated sections span an entire metablock, and then marks or in some way designates the metablock for physical erasure.

The technique of storing the LBA ranges of erased logical groups and concatenating erase sections may also be used in GC cycles. Usually when GC is performed, the erase pattern is written to the destination blocks for the logical groups that have been recorded as erased. For destination blocks that have the capacity to store information about multiple sections, such as for three LG's, if one of the LG's is erased and the others are not, then during GC the address table data structure may be updated to record the address range of the erased LG without writing the erase pattern to the destination block. The data for any of the three LG's may be updated independent of the others. Using this technique during GC cycles reduces the number of writes to flash memory 200. Also, the efficiency of erase operations may be improved by concatenating new erase commands received from the host 10 with the GC data stored in the updated address table data structure, and performing a physical erase when the logical block address range to be erased extends through the entire destination block.

Figure 6:
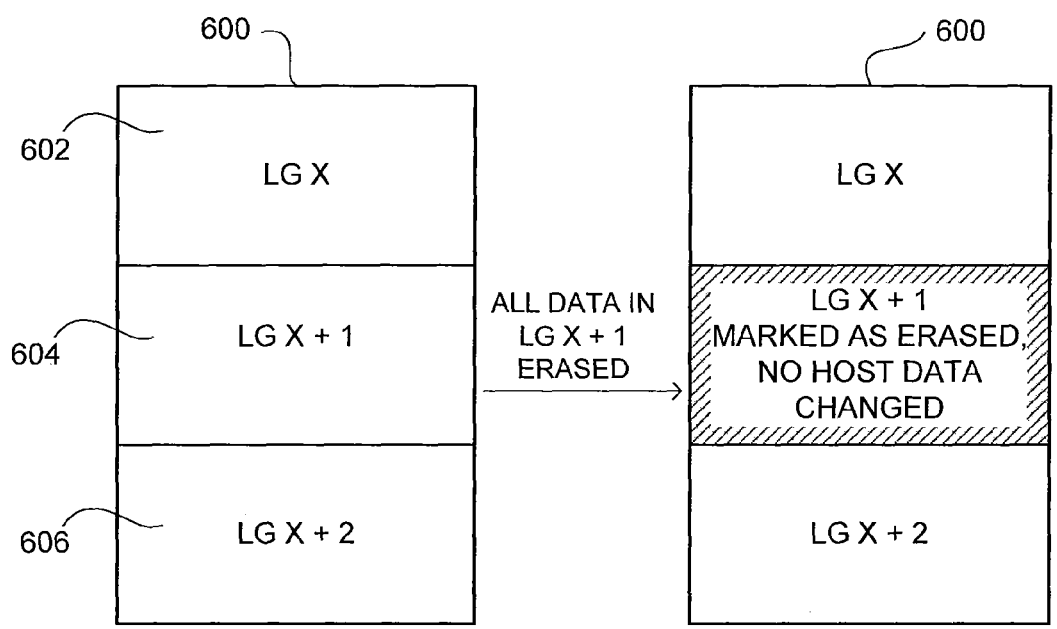
FIGS. 6A and 6B show a graphical representation of a partial erase command where an erased group is marked as erased by updating a group address table without writing the erase pattern to memory.

FIGS. 6A and 6B show a graphical representation of a partial erase command where an erased LG is marked as erased by updating a group address table (GAT) without writing the erase pattern to memory. A GAT keeps track of the mapping between logical groups of sectors and their corresponding metablocks. In FIG. 6A, metablock 600 includes three unerased (illustrated as unshaded areas) logical groups: LG X 602, LG X+1 604, and LG X+2 606. FIG. 6B shows that LG X+1 has been marked as erased. The metablock 600 cannot be returned to the free pool of blocks because LG X 602 and LG X+2 606 are not marked as erased. Also, rather than recording that LG X+1 604 is erased during GC, the address table may be updated to identify the address range of LG X+1 as erased. Subsequently, if LG X 602 is erased the address table is updated, and a GC write is not executed. Once LG X+2 606 is erased, the metablock 600 will contain only erased data and will be released to the free block list. Marking a LG address range as erased in an address table (e.g., GAT), and thereby caching the erase command, provides an efficient mechanism for handling partial erase commands. FIG. 6 shows three LG's per metablock as an example. The number of LG's stored per metablock may be one, two, three, four, or more.

As discussed above, the controller 100 stores the erase tail information in flash memory 200. The controller 100 may also store erase tail information in RAM 130 (e.g., SRAM) in addition to storing the information in flash memory 200. Storing the data in RAM allows the controller 100 to get the erase tail information without reading the flash memory 200. When the host 10 issues a read command, the controller 100 determines if the data is within a LBA range of an erase tail by referencing the RAM 130 (or memory 200 if the data is not stored in RAM). After a power cycle, the controller's initialization code reads the erase tail information from memory 200 and repopulates the RAM 130.

Further advantages may be realized because repetitive patterns do not have to be transferred to a buffer random access memory (BRAM) before being sent to the host 10. BRAM may be a partition of RAM 130. Instead, one sector of the erased pattern may be created in BRAM and that sector then repeatedly transferred to the host 10 for the length of the LBA range. This read process will reduce the read time for erased data. This technique may also be used to execute copy operations by creating one sector of the erase pattern and copying that sector multiple times for the address range of the erase data that is being copied. Because the number of erase cycles and write cycles is reduced, the endurance of the flash memory 200 is improved.

If the controller 100 receives an erase command that is not within the metablock of the previous erase command, the controller 100 may write the erase pattern for the tail to memory 200, clear out the tail information, and then process the received erase command. If the host 10 writes valid data to any sectors in the LBA range covered by the now erased tail, the controller 100 writes as erased sectors in the metablock the LBA's that are not part of the host write command. The amount of data written may be reduced by adjusting the information stored for the tail of the old erase command, however in all cases, the controller 100 stores information about the data which was previously erased.

Figure 7:
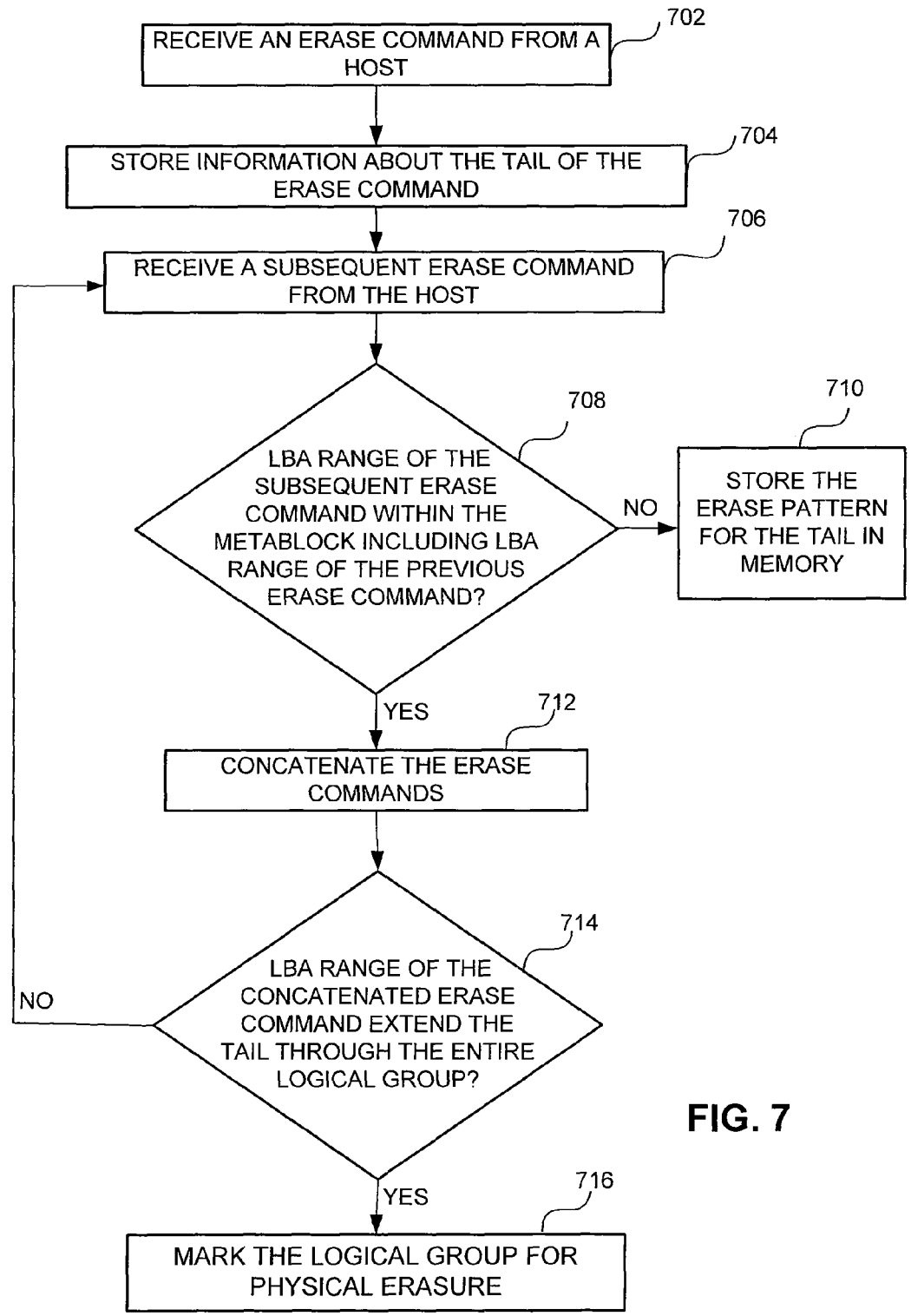
FIG. 7 shows acts for executing an erase operation in accordance with an embodiment of the disclosure.

FIG. 7 shows a version of acts for executing an erase operation in accordance with an embodiment of the disclosure. At 702 an erase command is received from a host. At 704 information about the tail of the erase command is stored. At 706 a subsequent erase command is received from the host. If, at 708, the LBA range of the subsequent erase command is not within the metablock that includes the LBA range of the previous erase command, the erase pattern for the tail is stored in memory (Act 710). If the LBA range of the subsequent erase command is within the metablock that includes the LBA range of the previous erase command, the erase commands are concatenated (Act 712). If, at 714, the LBA range of the concatenated erase command extends the tail through the entire logical group, the logical group is marked for physical erasure (Act 716). If the LBA range of the concatenated erase command does not extend the tail through the entire logical group, the process returns to Act 706.

Referring again to FIG. 2, a system and method will be described for recording in the memory system 20 patterned data received from the host 10 in a write command. Patterned data is any data that has a repeatable pattern. Examples include flat patterns and systematic patterns. A flat pattern is a single byte pattern that is repeated in the data. A systematic pattern is a multiple character pattern (e.g., four characters)

that is repeated in the data. The patterned data to be recorded is received as a logical sector, a logical cluster, or a logical group.

Pattern detection may be implemented with hardware and/or software techniques. The controller 100 may monitor, scan, and/or read the incoming data to detect a data pattern. For example, the controller 100 may monitor the incoming data as it is being transferred by the host 10 to the memory system 20, scan or read the data when the data is in a buffer (e.g., RAM 130), scan or read the data as the data is being transferred to flash memory 200 (such as by an encryption engine or ECC processor 120 or the optional co-processor 121), or it may scan the data after the data has been written to flash memory 200.

If the controller 100 detects a pattern, the data is not written to flash memory 200 (or if the data has already been written to flash memory 200, it may subsequently be marked as obsolete). Rather, the logical block address range of the data is marked in a data structure 114 as having pattern data. Depending upon the pattern or the application of the memory system 20, a record of the pattern itself may or may not be recorded. Because the data pattern is not written to flash memory 200, the freed up physical memory space may be utilized by the memory system 20 for other purposes. Examples of other uses of the freed up memory space include: as a binary cache, as an update block, as additional free or spare blocks in a block pool, and as space for index tables. The performance of the memory system 20 is improved because the data writes of the pattern data are handled by the process of erase handling, instead of by the inherently less efficient process of actually writing the pattern data to flash memory 200. In other words, it is more efficient to mark a logical block address range as having pattern data than it is to write the data to physical memory that corresponds to the entire logical block address range. Performance and endurance characteristics of the memory system 20 are also improved because additional memory space is available for use as a binary cache or update block.

Upon detecting a repetitive pattern, the controller 100 may record the pattern in the flash memory 200 without, as explained above, making a record of the data in the flash memory 200. However, the logical sector, cluster or group is marked as erased in a data structure 114 in the memory system 20. The data structure 114 may be a multi-sector data structure. A multi-sector data structure stores information about data that spans more than a single logical sector. In other words, a multi-sector data structure is structured to encompass logical block address ranges that are greater than a single sector.

If a zero (erase) data pattern is detected (i.e., the data received from the host resembles the erase pattern used by the memory system when performing a physical erase), the write command may be treated as an erase sectors command. In an erase sectors command the logical sector, cluster or group is marked in the data structure 114 as an erased area, freeing up a corresponding physical capacity. Another way to designate the free area is by marking the logical sector, cluster or group as "don't care" (e.g., as is done in a trim command to indicate that a memory area is no longer in use). If the detected pattern is other than an erase pattern, the logical sector, cluster or group is marked as erased, and the data pattern may or may not be recorded. If the incoming data includes systematic (or flat) and asystematic (non-pattern) data, the controller 100 records the asystematic data in flash memory 200, and handles the systematic or flat data by marking the corresponding logical block address range as erased in the data structure 114.

The controller 100 marks the logical block address range of the pattern data as erased or "don't care" in the data structure 114. For shorter fragments (less than a logical group), the logical block address range may be marked in an erased fragment descriptor, erased command log, or binary cache in the flash memory 200. For long pattern write commands that span entire logical groups, the logical block address range of the pattern data may be marked in a group address table. The corresponding pattern descriptor may or may not be recorded in the data structure 114. If the pattern descriptor is being recorded, for shorter fragments the descriptor may be stored in the erased fragment descriptor, the erased command log, or the binary cache. For long pattern write commands, the pattern descriptor may be added to the group address table. It is noted that in some applications it may not be necessary to record the pattern descriptor at all. In those cases the pattern is not recorded, thereby conserving additional memory space. For example, if the pattern that is detected is the erase pattern of the memory system 20, the pattern descriptor does not need to be stored for the corresponding logical sector, cluster or group.

Thus, the controller 100 provides a method for detecting a pattern in a logical sector, cluster or group that is to be written to the flash memory 200 when a write command is issued by the host 12. If the data has a flat repetitive pattern, for example, if all the bytes within the sector/cluster/group are the same, then the controller 100 may use the corresponding group address table (GAT) or other data structure entry to record the pattern, which in this case is one byte of data, and mark the sector/cluster/group as being erased. It is therefore not necessary to write the sector/cluster/group data to the flash memory 200 in order to record the data. Rather, it is enough to keep the information about the sector/cluster/group pattern in the GAT. Any obsolete copy of the data may then be erased in flash memory 200, as is the case when any data is written to the flash memory system 20. However, in this case, the new valid sector/cluster/group data is recorded in a GAT or other data structure entry instead of in the flash memory 200.

Referring again to FIG. 1, the interface 110 may include a pattern detection circuit 112 to compare data portions of incoming data when the host 10 issues a write command and sends a sector, cluster or group of data to the memory system 20. The pattern detection circuit 112 indicates to the processor 120 whether the incoming data has a pattern. The pattern detection circuit 112 may compare all the data portions (1 or more bytes) with one another. This can be done, for example, by fetching the first data portion and performing an exclusive OR (XOR) logical operation on it with all other data portions. At least one non-zero result indicates a non-flat pattern. A flat or systematic data pattern can be detected by XOR-ing every incoming data portion with the previous one. The pattern value of the incoming data then can be obtained by the processor 120 from the pattern detection circuit 112, or by reading any data portion from a buffer RAM (e.g., RAM 130). In an alternative version, the processor 120 or optional co-processor 121 may have a pattern detection facility to compare data portions of the sector/cluster/group data by reading the data when it is present in the buffer RAM. The pattern detection may alternatively be accomplished with a hardware engine, such as the ECC processor, performing a hash function on the data.

If a data pattern is detected the logical block address range of the sector/cluster/block of data is recorded in one of the data structures mentioned above, and marked as pattern data. If the recorded block address range does not span an entire logical group (such as a metablock), the range of logical block addresses that encompass the partial logical group is stored. When additional sectors/clusters/blocks having pattern data are received, the corresponding address ranges are recorded and marked. The controller 100 combines the stored logical block address ranges of the pattern data, thereby providing larger contiguous memory areas that may be used as a binary cache, as an update block, as additional free or spare blocks in a block pool, and as space for index tables. Larger contiguous memory areas for these purposes results in an overall improvement of the memory system 20.

When the host 10 issues a read command for a logical area previously written with a flat or systematic pattern, the controller 100 generates the data pattern on the basis of the default erase value for erased sectors, or on the basis of the pattern defined by a pattern descriptor in an erased fragment descriptor, erased command log, binary cache, or GAT in the flash memory 200. The performance of the memory system 20 is improved because, instead of having to read the data, the data is generated by the controller 100 and communicated to the host 10.

Figure 8:
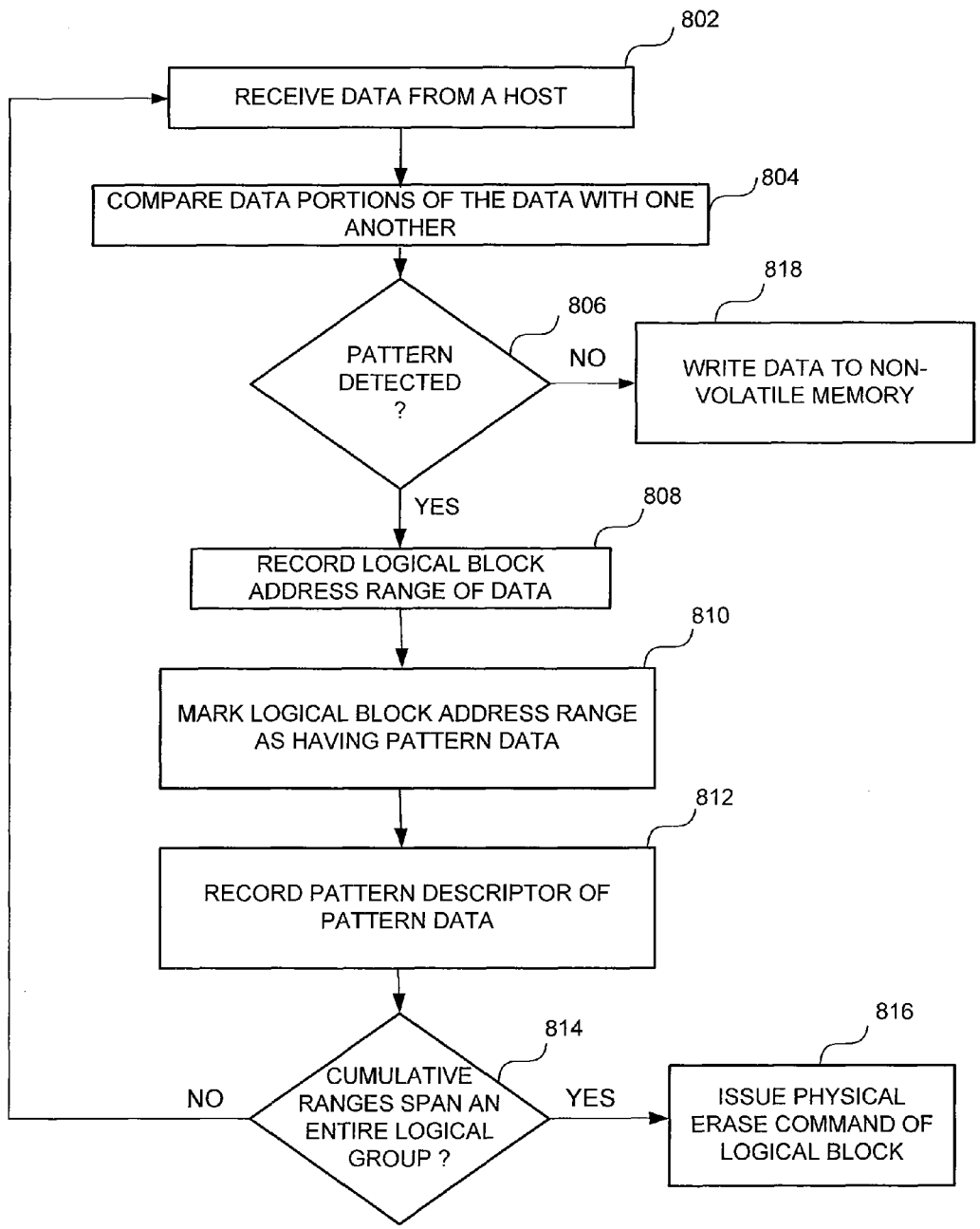
FIG. 8 shows acts for compressing data written to non-volatile memory in accordance with an embodiment of the disclosure.

FIG. 8 shows acts for compressing data written to non-volatile memory in accordance with an embodiment of the disclosure. At 802 data is received from a host. At 804 data portions of the data are compared to one another. If, at 806, a pattern is detected, the logical block address range of the data is recorded (Act 808). If a pattern is not detected, the data is written to non-volatile memory (Act 818). At 810, the logical block address range of the data is marked as having pattern data. At 812, a pattern descriptor of the data is recorded. If, at 814, the cumulative ranges of the logical block address ranges marked as having pattern data span an entire logical group, the logical group is erased (Act 816).

Although the example above describes logical address ranges spanning a logical group that consists of an entire metablock before erasure, in other embodiments patterns that span logical groups shorter than an entire metablock may also be converted into erase commands. For example, in a memory system where multiple logical groups are mapped to a single physical block, ranges of addresses with an erase pattern that is less than a metablock may be useful to convert to erase commands in order to free up some space. Examples of memory systems where the less than a metablock length erase pattern fragments may be effective to convert to erase commands include systems with binary cache areas that are used to gather discontinuous runs of data, or in memory systems such as those using a storage address remapping (STAR) technique where multiple discontiguous address runs may be mapped to a single metablock. An example of a STAR operating system is seen in U.S. application Ser. No. 12/036,014, filed Feb. 22, 2008, which is hereby incorporated by reference in its entirety. In one implementation, the binary cache is a data structure that is a set of dedicated blocks in flash memory set aside to store fragments of data that may or may not be later consolidated and/or compacted as part of a logical group and that also stores the location and length of the fragments in a binary cache index (BCI) maintained in the binary cache.

In order to free up the extra physical capacity through merging and concatenating erase fragments for smaller-than-block-size logical groups, a compaction process may also need to be executed. Two different scenarios involving compaction are contemplated: compaction of essentially random erase fragments found in binary cache storage (where data is generally stored in small fragments and not logical groups) and compaction of data in memory blocks where data is organized in smaller-than-block-size logical groups. With respect to erase fragments in memory blocks organized in smaller-than-block-size logical groups, compaction is a process where, in a block having multiple logical groups, logical groups with valid data are moved to a new block so that only invalid data remains and the original block is available for reuse. If, for example, blocks in memory are organized to have two logical groups per block and commands for erase data had been received and merged/concatenated so that one logical group in each of two different blocks were now completely obsolete, the extra physical capacity in these blocks can only be released by a compaction step where the valid logical groups are moved to a third block. Once the single valid logical group in each of the two original blocks are copied into a third block, then the two original blocks are available for reuse. In this situation, the concatenation and merger of erase fragments of smaller-than-block-size logical groups, followed by a compaction step, can provide a net gain of physical capacity where two blocks are freed up by moving one block's worth of data.

With respect to compaction of essentially random erase fragments found in binary cache storage (where data is generally stored in small fragments and not logical groups), the erase fragments may be concatenated and then compacted when more free physical storage space is desired in the binary cache. Alternatively, instead of a using a compaction step to free up a physical block, the obsolete capacity in the binary cache may be reclaimed by freeing up fragment descriptors in the indexing structures (BCI), in situations where the erase activity in the memory happens to obsolete more erase fragments than are created.

Figure 9:
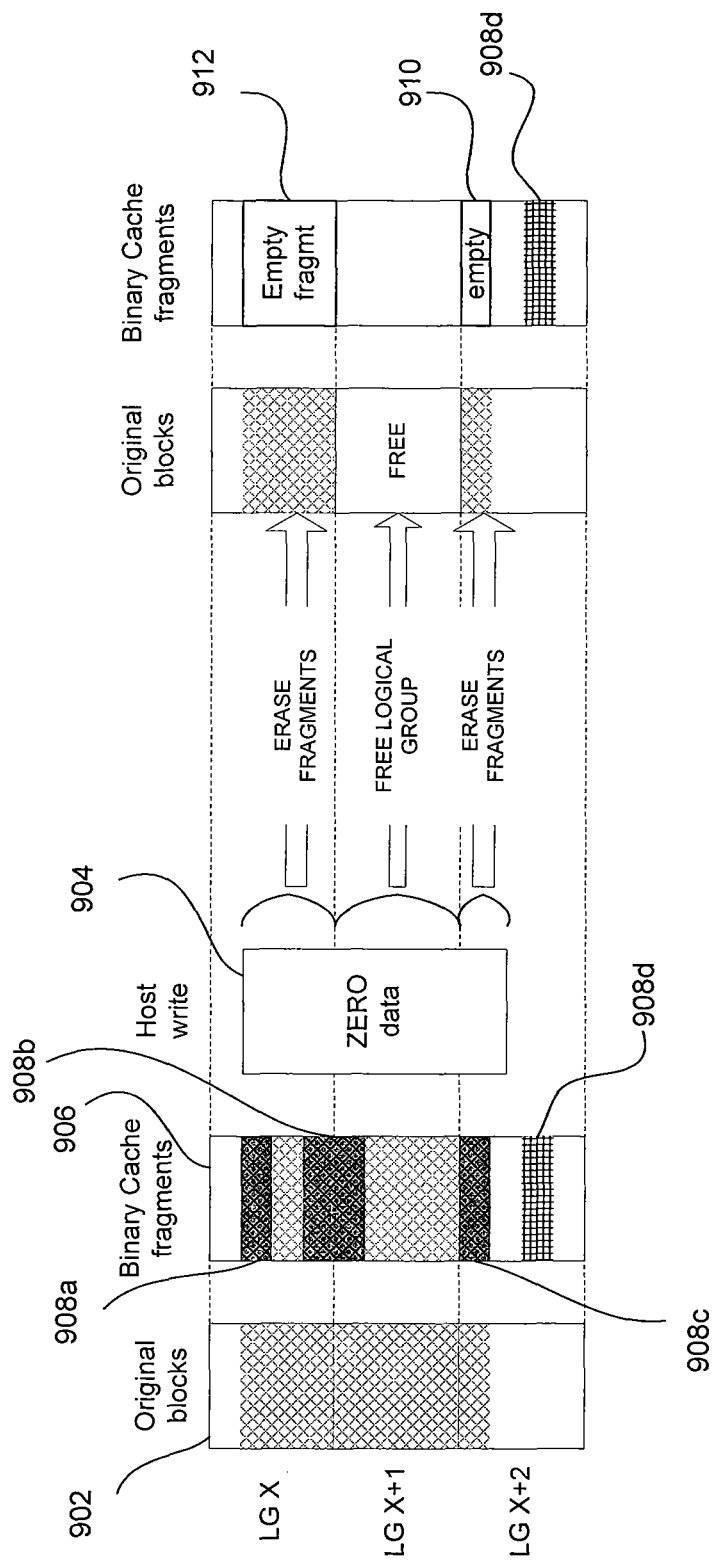
FIG. 9 illustrates a data flow for a host write of a zero (erase) data pattern that overlaps all or a portion of each of three logical groups in a metablock.

FIG. 9 is a more detailed illustration of FIG. 6 and demonstrates a scenario when a host writes an erase pattern of zeros to a portion of metablocks associated with three logical groups (LG X, LG X+1 and LG X+2). In the illustrated operation, the original three metablocks 902 correspond to the three logical groups LG X, LG X+1 and LG X+2, respectively, that are managed as a logical group triplet. At some point in time after the data was written into the original metablocks 902, updates were made to portions of the logical groups as represented by data fragments 908*a*-908*d*. These data fragments 908*a*-908*d* are physically stored in the binary cache 906 and represent the most recent version of the data for the particular logical addresses they are associated with so that the data in the original blocks 902 at those particular logical addresses are obsolete, while the remaining data in the original blocks 902 is still valid. Subsequently, the host sends a zero data pattern (erase command) 904 that covers a logical range of data made obsolete by an operation at the host represented by the cross-hatched region in the original blocks 902 and corresponding area of the binary cache 906. In this example, the zero data pattern 902 written by the host, as indicated by the shaded region on the original blocks 902, covers the entirety of LG X+1 and portions of LG X and LG X+2. Only data fragments 908*a*-908*c* are encompassed by the logical range of the erase command 904. As a result of the erase command 904, the entire identified range is now free. For LG X an erase fragment is created that includes 908*a* and the first part of 908*b*, for LG X+1, the erase overlaps the entire logical group so the entire logical group is marked as free (in this case the logical group is the same size as a physical block) and the portion of 908*b* in the binary cache is marked obsolete, for example by removing the reference to that portion of 908*b* in the BCI. The binary cache index of the binary cache is updated to indicate that the fragments 908*a* through 908*c* are now empty fragments 912, 910. Empty fragments 910, 912 are virtual fragments in the sense that the BCI in the binary cache corresponding to the logical addresses of the fragments has been marked to indicate that the fragments are obsolete (empty). Data fragment 908*d* remains a valid fragment physically stored in the binary cache because it was not part of the erase command and the BCI for the logical addresses associated with that fragment are still marked as valid.

In the example of FIG. 9, the logical groups may be the same size as the physical blocks and separately manipulated (as described above), may be organized as a logical group triplet where the logical groups are in a fixed order having contiguous logical addresses and the logical group triplet is the size of a physical block, or any number of noncontiguous logical groups may all fit within a block in any order. The operation of the binary cache is independent whichever of these three variations of logical group organization are implemented.

As described above, when an erase command spans an entire logical group, that logical group may be logically marked as erased. If the erase command is for a head or tail that is smaller than a complete logical group, the information is recorded as and erase fragment and the controller accumulates and aggregates subsequent erase fragments until the erase fragments can be concatenated into an entire logical group. The erase commands containing the logical ranges of fragments of the logical group may be received in any order and it is not necessary that they be received in sequential address order. Upon concatenating the erase fragments into an entire logical group, the logical group may be marked as erased. In order to free up a physical block associated with the logical group, the logical group needs to be the same size as a metablock. In situations where a logical group is smaller than a metablock, compaction may be required as noted above, in order to free up physical space. By logically recording erase patterns for fragments and logical groups marked as erased, data reads in the memory may be accelerated because the controller only needs to read the indexing information for the logically erased metablock or fragments rather than reading the flash memory itself.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for improving data storage efficiency of data sent by a host to a controller in a memory system having a non-volatile memory portion, the controller configured to store the data sent by the host, the method comprising the controller of the memory system:
   receiving the data from the host;
   detecting a repeated pattern in the data;
   recording in a data structure that is separate from the non-volatile memory portion, a logical block address range of data having the detected repeated pattern, and recording in the data structure, a pattern descriptor corresponding to the detected repeated pattern, the recording occurring without writing the data having the detected repeated pattern to the memory portion;
   marking the logical block address range in the separate data structure as having pattern data; and
   generating the data based on the pattern descriptor by repeating the detected pattern multiple times within the logical block address range without reading the data from the non-volatile memory portion when a read command is issued for the logical block address range.

2. The method of claim 1 wherein the data structure is one of:
   an erased fragment descriptor, an erased command log, a binary cache, or a group address table.

3. The method of claim 2 further comprising the controller of the memory system recording the pattern descriptor of the pattern data in one of the erased fragment descriptor, the erased command log, the binary cache, or the group address table.

4. The method of claim 1, wherein detecting the repeated pattern in the data comprises controller comparing data portions in the data with one another.

5. The method of claim 4 wherein the data portions are compared by an XOR operation between successive data portions.

6. The method of claim 1 further comprising the controller of the memory system:
   recording in the data structure a plurality of logical block address ranges of data received from the host; and
   marking the plurality of logical block address ranges in the data structure as having pattern data.

7. The method of claim 6 further comprising the controller of the memory system:
   issuing a physical erase of the plurality of logical block address ranges if it is determined that the plurality of logical block address ranges spans an entire logical group.

8. The method of claim 7 wherein the logical group is a metablock.

9. The method of claim 1 further comprising the controller of the memory system utilizing an area of physical memory corresponding to the logical block address range as at least one of a binary cache, an update block, a spare block in a block pool, or an index table.

10. The method of claim 1 further comprising the controller of the memory system detecting the repeated pattern in the data by monitoring the data as the data is received from the host.

11. A non-volatile memory system comprising:
   a non-volatile memory portion configured to store data sent by a host;
   a data structure that is separate from the non-volatile memory portion; and
   a controller configured to:
      receive the data from the host;
      detect a repeated pattern within the data from a comparison of multiple portions of the data with each other, wherein the data is received from the host in response to one write command;
      record in the data structure that is separate from the non-volatile memory portion, a logical block address range of data having the detected repeated pattern and record in the data structure, a pattern descriptor corresponding to the detected repeated pattern, the recording occurring without writing the data having the detected repeated pattern to the memory portion of the non-volatile memory system;
      mark the logical block address range in the separate data structure as having pattern data; and
      generate the data in response to a read command based on the pattern descriptor by repetition of the detected repeated pattern instead of a read of the data from the non-volatile memory portion.

12. The non-volatile memory system of claim 11 wherein the data structure is one of: an erased fragment descriptor, an erased command log, a binary cache, or a group address table.

13. The non-volatile memory system of claim 12 wherein the controller is configured to record the pattern descriptor of the pattern data in one of the erased fragment descriptor, the erased command log, the binary cache, or the group address table.

14. The non-volatile memory system of claim 11 wherein the controller is configured to compare the data portions by an XOR operation between successive data portions.

15. The non-volatile memory system of claim 11 wherein the controller is configured to:
   record in the data structure a plurality of logical block address ranges of data received from the host; and
   mark the plurality of logical block address ranges in the data structure as having pattern data.

16. The non-volatile memory system of claim 15 wherein the controller is configured to issue a physical erase of the plurality of logical block address ranges if the controller determines that the plurality of logical block address ranges spans an entire logical group.

17. The non-volatile memory system of claim 16 wherein the logical group is a metablock.

18. The non-volatile memory system of claim 11 wherein the controller of the memory system is configured to utilize an area of physical memory corresponding to the logical block address range as at least one of a binary cache, an update block, a spare block in a block pool, or an index table.

19. The non-volatile memory system of claim 11 wherein the controller is configured to detect the repeated pattern in the data by monitoring the data as the data is received from the host.

\* \* \* \* \*